(No Model.)

J. AUSTIN.
PLOW.

No. 244,367. Patented July 19, 1881.

Witnesses.
Henry Frankfurter,
F. F. Warner.

Inventor.
John Austin

UNITED STATES PATENT OFFICE.

JOHN AUSTIN, OF CHICAGO, ILLINOIS.

PLOW.

SPECIFICATION forming part of Letters Patent No. 244,367, dated July 19, 1881.

Application filed January 3, 1881. (No model.)

*To all whom it may concern:*

Be it known that I, JOHN AUSTIN, of Chicago, in the county of Cook and State of Illinois, have invented certain new and useful Improvements in Plows, of which the following, in connection with the accompanying drawings, is a specification.

Figure 1:
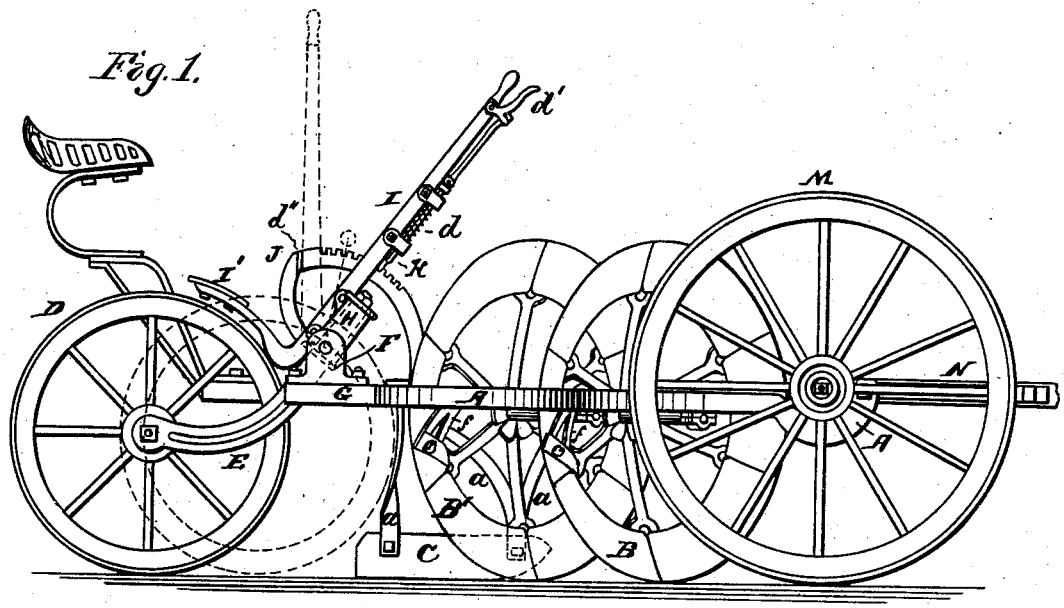
Figure 2:
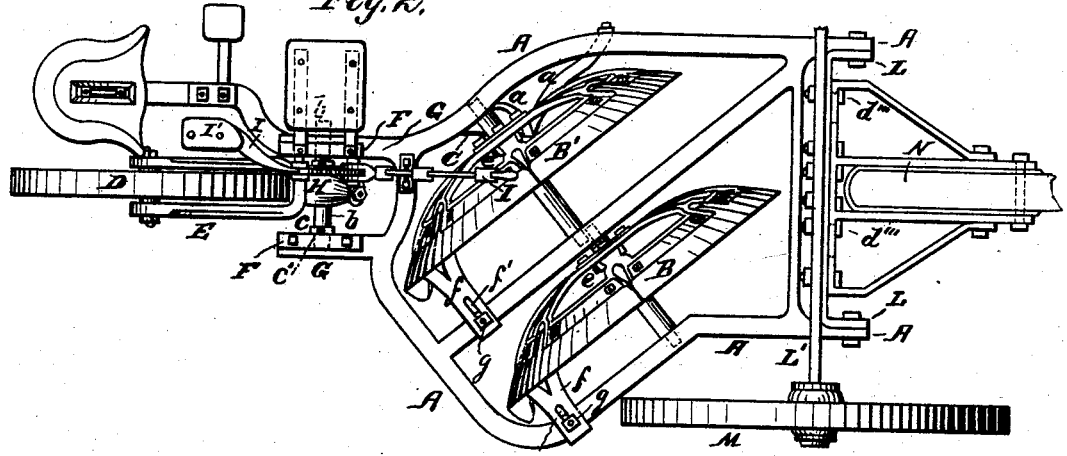
Figure 3:
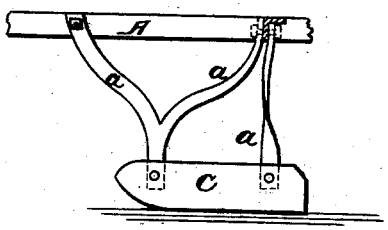

In the drawings, Figure 1 is a side elevation of a rotary plow embodying my improvements. Fig. 2 is a top or plan view thereof, and Fig. 3 is a detail of the landside.

Like letters of reference indicate like parts.

My invention relates, chiefly, to the class of rotary plows shown and described in Letters Patent No. 216,592, dated June 17, 1879, and issued to me by the United States of America, for the improvements therein set forth.

In the drawings, A represents the beam or frame of the plow.

B and B′ are the rotary plowing-disks, the disk B′ being the one toward or nearest the land when more than one is employed.

C is the landside, which I employ for preventing the tending to lateral movement on account of the diagonal arrangement of the plowing-disks. This landside consists, as represented in Figs. 1, 2, and 3, of a plate sufficiently long and broad or high to present a considerable surface to the land. It may be sharpened or made somewhat pointed at its forward end, to aid it in cutting the soil, as indicated in Fig. 3. This landside I attach firmly to the frame A, and *a a* are strong and rigid arms or braces which I employ for that purpose, the said arms being, by preference, bolted to the frame and flush-bolted to the landside, as indicated in Fig. 3. The position of this landside should be such as to follow in one of the furrows of the plowing-disks. In Figs. 1 and 2 I have shown it arranged to follow in the furrow cut by the rear or land disk, B′; but it may instead be arranged to follow in the furrow made by the disk B, or both disks may be followed by a landside.

D is the rear carriage-wheel, which also serves as a caster, in the manner hereinafter described.

E is a bent and forked hanger or stock, in the lower end of which the wheel D is journaled.

F F are boxes or bearings on arms G G, extending from the rear part of the frame A.

H is a cylindrical box, having trunnions *b b*, supported in the bearings F F, and these trunnions are long enough to admit of their being adjusted in their bearings laterally—say to the extent of about three inches. Movable collars *c c* are mounted on the trunnions *b b*, and *c′ c′* are set-screws for securing these collars rigidly to the said trunnions after adjusting the box H, as may be desired. It may be secured in place by adjusting the said collars on the trunnions. The upper end of the stock E enters the box H, and is capable of being rotated therein when the said box stands vertically, as will be hereinafter explained.

I is a bent lever applied rigidly to the box H. The lower arm of this lever serves as a foot-rest for the driver, as shown at I′.

J is a cogged segment applied adjustably to the rear part of the frame A, and K is a bolt applied to the lever I, and held to engagement with the segment J by means of a spring, *d*. This bolt may be drawn from its engagement with the segment J by means of the small lever *d′*, pivoted to the upper end or handle of the lever I, and arranged to be seized and operated when the handle of the lever I is seized. By seizing the handle of the lever I and drawing it back, and at the same time pressing down upon the foot-rest, the lever may be easily brought to a vertical position, as indicated by the dotted lines in Fig. 1. When the lever I is raised to its vertical position it meets a stop, *d″*, on the segment J, and a further upward movement of the lever is thereby prevented. As soon as the lever is released its locking-bolt engages the segment, and the lever is thus locked in its vertical position. As the lever I is moved to its vertical position the frame A, and consequently the plowing-disks, will be raised, thus carrying these disks and the landside out of the ground and rendering them inoperative, so that the plows may be drawn about without cutting furrows. When the lever stands vertically it is obvious that the upper end of the stock E can rotate in the box H, and hence that the wheel D will be shifted automatically, so as to permit the carriage to be turned with facility as it is being drawn along while inoperative. In other words, the wheel D then operates as a caster. But when the frame A is lowered to set the plows for work the box H assumes an inclined position, and consequently the upper end of the stock E cannot then rotate in the said box. The wheel D is therefore then prevented from being turned laterally, owing to the position of the box H and to the form and position of the stock E. The wheel D therefore then very materially aids in causing the plows to move in a straight line while the work is being done, it being understood that the wheel D follows in the furrow cut by the disk B'. I have made provision for adjusting the disk B' laterally on its axle by a sliding movement thereon, as will be hereinafter explained; and hence I have also made the provision described for adjusting the wheel D laterally by moving the box H laterally. The segment J is made adjustable laterally, so that it may be set to correspond with the changed position of the box H and lever I after the adjustment laterally of the said box. This adjustability of the segment J may be provided for either by making a series of bolt-holes in the frame A, to receive the bolts for securing the segment-frame, or by slotting the feet of the segment and passing the bolts through these slots.

L L are ears or lugs extending forward from and bolted to the axle L' of the forward or draft wheels M M, and the forward end of the frame A is hinged to these lugs, so that the rear end of the frame may be raised and lowered in the manner described. By hinging the forward end of the frame A forward of the axle L' in this manner, the forward disk, B, may be set very near that axle, and yet will be raised to a much greater distance when the lever I is set vertically than when the frame is hinged behind the axle L', unless the disk B be also set much behind the joints on which the frame is swung. Greater compactness of the parts is thus secured.

N is the draft-tongue. I connect this tongue to the carriage in such a manner that the tongue may be adjusted laterally—say to the extent of about three inches—and this adjustment may be provided for by employing bolts and nuts, as shown at $d''' d'''$, enough bolt-holes being made to admit of the degree of adjustment desired; or the bolts may pass through slots for that purpose.

I make the disk B' adjustable laterally on its axle. This adjustment may be accomplished with facility by means of one or more set-screws, $e\ e$, passing through the hub of that disk. The disk B may also be made adjustable laterally in like manner; but it is not essential to make both disks laterally adjustable. By making the wheel D, disk B', and tongue adjustable in the manner now described, I am enabled to vary the width of furrow cut by the two disks. For example, if $z\ z$ in Fig. 4 represents the greatest width of furrow capable of being cut by both disks, this width may be diminished by setting the disk B' nearer the disk B, and by adjusting the wheel D and the tongue accordingly. The adjustment of the tongue permits the team to travel properly with respect to the furrows already laid, and the adjustment of the wheel D causes it to follow the newly-adjusted disk B' properly. The landside C may also be correspondingly adjusted in a series of bolt-holes in the frame A, if such adjustment be deemed essential.

O O are the mold-boards, and $f\ f$ are their shanks or stocks. I slot the parts $f\ f$, as shown at $f'\ f'$, and attach the mold-boards adjustably to the frame A by means of bolts and nuts, as shown at $g\ g$, the said bolts passing through the slots $f\ f$, as represented. By this means the mold-boards may not only be adjusted with relation to the concave faces of the disks B and B', but the mold-board operating in connection with the disk B' may also be adjusted to correspond with the adjustment of that disk.

Having thus described my invention, what I claim as new, and desire to secure by Letters Patent, is—

1. The combination, in a rotary plow, of one or more diagonally-arranged rotary plowing-disks, B B', and the landside C, the latter consisting of a thin vertical blade in the form of a shoe, constructed, adapted, and arranged, substantially as shown and described, to follow one of the said disks and to enter the soil vertically near the land side of the furrow, for preventing the tendency of lateral movement of the plow, owing to the diagonal arrangement of the plowing-disks, as set forth.

2. The combination, with each other and the beam or frame of a rotary wheeled plow, of the pivoted and laterally-adjustable box H, the wheel D, the hanger or stock E, entering the said box and being rotary therein, and carrying the said wheel, the lever I, applied rigidly to the said box, and the adjustable segment J, substantially as and for the purposes specified.

3. The combination, with each other and the beam or frame of a rotary wheeled plow, of the pivoted and laterally-adjustable box H, having elongated trunnions $b\ b$, the bearings F F, the adjustable collars $c\ c$, mounted on the said trunnions, the wheel D, the rotary hanger or stock E, and a lever and locking device for controlling the inclination of the said box, for the purposes set forth.

4. The combination of the frame A, having on its rear end the arms G G, the boxes F F, the laterally-adjustable box H, having trunnions $b\ b$, the wheel D, the hanger or stock E, the lever I and its bolt, and the laterally-adjustable cogged segment J, substantially as and for the purposes specified.

JOHN AUSTIN.

Witnesses:
F. F. WARNER,
H. FRANKFURTER.